US011465120B2

(12) United States Patent
Inamura et al.

(10) Patent No.: US 11,465,120 B2
(45) Date of Patent: Oct. 11, 2022

(54) NITROGEN OXIDE SORBENT AND EXHAUST GAS CLEANING CATALYST

(71) Applicant: Mitsui Mining & Smelting Co., Ltd., Tokyo (JP)

(72) Inventors: Masaaki Inamura, Saitama (JP); Masaaki Haneda, Aichi (JP); Yuma Kako, Aichi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 218 days.

(21) Appl. No.: 16/760,533

(22) PCT Filed: Nov. 7, 2018

(86) PCT No.: PCT/JP2018/041396
§ 371 (c)(1),
(2) Date: Apr. 30, 2020

(87) PCT Pub. No.: WO2019/093391
PCT Pub. Date: May 16, 2019

(65) Prior Publication Data
US 2021/0197171 A1  Jul. 1, 2021

(30) Foreign Application Priority Data

Nov. 13, 2017  (JP) .............................. JP2017-217974

(51) Int. Cl.
| | | |
|---|---|---|
| *B01J 20/02* | (2006.01) | |
| *B01J 20/28* | (2006.01) | |
| *B01J 20/32* | (2006.01) | |
| *B01J 21/04* | (2006.01) | |
| *B01J 21/06* | (2006.01) | |
| *B01J 21/10* | (2006.01) | |
| *B01J 23/10* | (2006.01) | |
| *B01J 23/38* | (2006.01) | |
| *B01J 23/42* | (2006.01) | |
| *B01J 23/46* | (2006.01) | |
| *B01J 23/48* | (2006.01) | |
| *B01J 23/58* | (2006.01) | |
| *B01J 23/63* | (2006.01) | |
| *B01J 23/64* | (2006.01) | |
| *B01J 23/78* | (2006.01) | |
| *B01J 23/83* | (2006.01) | |
| *B01J 23/89* | (2006.01) | |
| *B01J 27/232* | (2006.01) | |
| *B01J 35/10* | (2006.01) | |
| *B01J 37/00* | (2006.01) | |
| *B01J 37/04* | (2006.01) | |
| *F01N 3/08* | (2006.01) | |
| *B01J 20/06* | (2006.01) | |

(52) U.S. Cl.
CPC .......... *B01J 20/06* (2013.01); *B01J 20/0225* (2013.01); *B01J 20/28059* (2013.01); *B01J 20/28061* (2013.01); *B01J 20/3204* (2013.01); *B01J 20/3236* (2013.01); *B01J 20/3289* (2013.01); *B01J 21/066* (2013.01); *B01J 23/10* (2013.01); *B01J 23/42* (2013.01); *B01J 27/232* (2013.01); *B01J 35/1014* (2013.01); *F01N 3/0814* (2013.01); *F01N 3/0842* (2013.01); *F01N 2250/12* (2013.01); *F01N 2510/0684* (2013.01); *F01N 2570/14* (2013.01)

(58) Field of Classification Search
CPC .............. B01J 20/0225; B01J 20/28059; B01J 20/28061; B01J 20/3204; B01J 20/3236; B01J 20/3289; B01J 21/04; B01J 21/066; B01J 21/10; B01J 23/10; B01J 23/38; B01J 23/42; B01J 23/46; B01J 23/48; B01J 23/58; B01J 23/63; B01J 23/6484; B01J 23/78; B01J 23/83; B01J 23/8906; B01J 23/894; B01J 23/8946; B01J 27/232; B01J 35/1014; B01J 37/00; B01J 37/04; F01N 3/0814; F01N 3/0842
See application file for complete search history.

(56) References Cited

U.S. PATENT DOCUMENTS

| | | | |
|---|---|---|---|
| 6,306,360 B1 | 10/2001 | Yamamoto et al. | |
| 6,338,831 B1 * | 1/2002 | Strehlau ............ | B01J 20/28042 423/244.1 |

(Continued)

FOREIGN PATENT DOCUMENTS

| | | |
|---|---|---|
| JP | 2001-252563 A | 9/2001 |
| JP | 2001-259416 A | 9/2001 |

(Continued)

OTHER PUBLICATIONS

International Search Report (ISR) dated Feb. 5, 2019 filed in PCT/JP2018/041396.

(Continued)

*Primary Examiner* — Cam N. Nguyen
(74) *Attorney, Agent, or Firm* — Rankin, Hill & Clark LLP

(57) ABSTRACT

A nitrogen oxide storage material comprising: $Mg_{1-y}Al_2O_{4-y}$, wherein y is a number satisfying $0 \leq y \leq 0.2$, a noble metal, an oxide of a metal other than the noble metal, and a barium compound, the noble metal, the oxide, and the barium compound being loaded on $Mg_{1-y}Al_2O_{4-y}$. The metal oxide comprises at least one metal oxide selected from zirconium oxide, praseodymium oxide, niobium oxide, and iron oxide.

10 Claims, No Drawings

(56) References Cited

U.S. PATENT DOCUMENTS

| | | | |
|---|---|---|---|
| 6,350,421 B1* | 2/2002 | Strehlau | B01J 23/63 502/514 |
| 8,454,917 B2* | 6/2013 | Hoyer | B01J 23/63 502/340 |
| 8,853,123 B2* | 10/2014 | Jung | B01J 23/63 502/355 |
| 9,821,293 B2* | 11/2017 | Jung | B01J 23/10 |
| 10,151,227 B2* | 12/2018 | Armitage | B01J 37/0246 |
| 10,279,337 B2* | 5/2019 | Schoneborn | B01J 37/0045 |
| 10,532,344 B2* | 1/2020 | Chandler | B01J 21/04 |
| 10,801,382 B2* | 10/2020 | Ochiai | F01N 3/035 |
| 2003/0125202 A1 | 7/2003 | Ruwisch et al. | |
| 2008/0182746 A1 | 7/2008 | Matsueda et al. | |
| 2009/0131251 A1 | 5/2009 | Matsueda et al. | |
| 2011/0154807 A1* | 6/2011 | Chandler | B01J 37/0244 60/299 |
| 2011/0207601 A1 | 8/2011 | Matsueda et al. | |
| 2013/0336865 A1 | 12/2013 | Brisley et al. | |
| 2017/0314438 A1 | 11/2017 | Brown et al. | |

FOREIGN PATENT DOCUMENTS

| | | |
|---|---|---|
| JP | 2001-259422 A | 9/2001 |
| JP | 2001-300302 A | 10/2001 |
| JP | 2003-210988 A | 7/2003 |
| JP | 2007-167780 A | 7/2007 |
| JP | 2008-12480 A | 1/2008 |

OTHER PUBLICATIONS

Kako et al., "Effect of metal oxide additives on NOx sorption property of Pt supported barium containing composite oxides", Proceeding of Annual / Fall Meetings of the Japan Petroleum Institute, The 47th Petroleum-Petrochemical Symposium of JPI (Tottori), Nov. 16, 2017, p. 160; Cited in ISR.

Extended European Search Report dated Nov. 3, 2020 issued in the corresponding European patent application No. 18876879.0.

* cited by examiner

NITROGEN OXIDE SORBENT AND EXHAUST GAS CLEANING CATALYST

CROSS-REFERENCE TO RELATED APPLICATIONS

This application is a National Phase Application of International Application No. PCT/JP2018/041396, filed Nov. 7, 2018, which claims the priority of Japan Patent Application No. 2017-217974, filed Nov. 13, 2017. The present application claims priority from both applications and each of these applications is herein incorporated in their entirety by reference.

TECHNICAL FIELD

This invention relates to a nitrogen oxide storage material and a catalyst for exhaust gas purification.

BACKGROUND ART

Techniques of using a nitrogen oxide (hereinafter, $NO_x$) storage material composed of a basic support, e.g., $MgAl_2O_4$ or $ZrO_2$, and a noble metal loaded thereon in exhaust gas purification are known. With the recent demand for control of fuel consumption, not only diesel engines but lean-burn gasoline engines have been attracting attention. For these engines, a management system has been developed and put to practical use in which the air-fuel mixture is normally burnt under fuel-lean conditions (excess oxygen) and intermittently burnt under fuel-stoichiometric to rich conditions to make the exhaust gas reductive thereby to reduce $NO_x$. As a catalyst suited to this system, $NO_x$ storage materials capable of storing $NO_x$ under lean conditions and releasing the stored $NO_x$ in fuel-stoichiometric to rich conditions and $NO_x$ storage-reduction (NSR) catalysts containing the $NO_x$ storage material have been developed. The $NO_x$ storage material usually oxidizes NO generated in the fuel lean atmosphere to $NO_2$ by the action of the noble metal, allows the $NO_2$ to be adsorbed onto the basic support, and desorbs NO or $NO_2$ in the fuel-stoichiometric to rich atmosphere. The NO and $NO_2$ released in the fuel-stoichiometric to rich atmosphere react with CO or HC (hydrogen carbide) in exhaust gas.

Various types of $NO_x$ storage materials have been reported. For instance, patent literature 1 listed below discloses a purification catalyst obtained by adding zirconia sol to an $MgAl_2O_4$ spinel powder and further adding thereto Pt and potassium. Patent literature 2 below discloses a $NO_x$ storage material comprising $MgAl_2O_4$ powder and an alkali metal and Pt loaded thereon. Patent literature 2 describes the inconvenient of an alkaline earth metal as compared with alkali metals in improving $NO_x$ storage capacity in high temperatures, saying that "a $NO_x$ storage-reduction catalyst having an alkaline earth metal as a $NO_x$ storage material has the disadvantage of small storage capacity in high temperatures and, instead, a $NO_x$ storage-reduction catalyst composed of a basic support and an alkali metal and a noble metal loaded thereon proved capable of storing large quantities of $NO_x$ at up to high temperatures."

Patent literature 3 relates to the technique of using an alkali metal to increase $NO_x$ storage capacity in high temperatures similarly to patent literature 2. Patent literature 3 recites in the section "Problems to be Solved by Invention" (para. [0008]) "a $NO_x$ storage-reduction catalyst composed of a basic support and a noble metal and an alkali metal loaded thereon undergoes reduction in noble metal activity due to the interaction between the alkali metal and the basic support, thereby reducing in NO oxidative activity. As a result, the $NO_x$ storage capacity decreases totally. This inconvenience offsets both the improving effect on $NO_x$ storage performance and the nitrate stabilizing effect in high temperatures. Therefore, the catalyst cannot be said to have sufficient $NO_x$ storage performance in high temperatures". To solve this problem, patent literature 3 teaches loading a noble metal on a porous support instead of a basic support.

Patent literatures 4 and 5 below describe a storage material having an increased $NO_x$ adsorption rate at low temperatures, which is obtained by loading a basic support, such as zirconia, with a noble metal in the form of a colloid.

CITATION LIST

Patent Literature

Patent literature 1: U.S. Pat. No. 6,306,360B1
Patent literature 2: JP 2001-252563A
Patent literature 3: JP 2001-259422A
Patent literature 4: JP 2001-259416A
Patent literature 5: JP 2001-300302A

SUMMARY OF INVENTION

During relatively low load operation of a lean-burn gasoline engine or in relatively low temperatures (e.g., not higher than 450° C., particularly 250° to 450° C.) of emissions from a diesel engine, a $NO_x$ storage capacity is secured relatively easily by applying a sufficient amount of a $NO_x$ storage material to a catalyst substrate. However, with the recent increasing stringency of $CO_2$ emissions control, further improvement on $NO_x$ conversion performance has been sought. In order to further improve the $NO_x$ conversion performance in low temperatures, it is necessary to trap and store the $NO_x$ gases flowing through an NSR catalyst, allowing as little escape as possible. With this view, a technique for allowing increase of $NO_x$ storage rate is needed. As used herein, the term "$NO_x$ storage rate" refers to the amount of $NO_x$ stored by a $NO_x$ storage material in a certain period of time, e.g., per second or minute.

While as stated above an NSR catalyst is an exhaust aftertreatment technique used in both diesel engines and lean-burn gasoline engines, diesel engines and lean-burn gasoline engines are characterized by their exhaust gas temperatures. The exhaust gas from diesel engines has relatively low temperatures (e.g., below 450° C.), whilst that from lean-burn gasoline engines is higher in average (e.g., above 450° C.) than that from diesel engines. Hence, there has been a demand for an NSR catalyst having a high $NO_x$ storage capacity in high temperatures and suited for use in not only diesel engines but lean-burn gasoline engines.

The techniques according to patent literatures 1 and 2 are designed with consideration for high-temperature $NO_x$ storage capacity to meet the demand but these techniques do not pay attention to obtaining a catalyst having a high $NO_x$ storage rate in low temperatures.

Patent literature 3, as stated above, aims at avoidance of reduction in noble metal activity by loading a noble metal on a porous support other than basic supports. However, because porous supports other than basic supports generally have lower $NO_x$ storage performance than basic supports, the technique of loading a noble metal on a support other than basic supports as proposed in patent literature 3 still leaves room for improvement on low-temperature $NO_x$ storage performance and high-temperature $NO_x$ storage capacity.

In patent literatures 4 and 5, no considerations are given to increasing high-temperature $NO_x$ storage capacity of $NO_x$ storage materials.

Accordingly, an object of the invention is to improve a catalyst material for exhaust gas purification and more particularly to provide a $NO_x$ storage material having both low-temperature $NO_x$ storage rate and high-temperature $NO_x$ storage capacity in good balance.

The inventors have extensively investigated the structure of a $NO_x$ storage material that secures low-temperature $NO_x$ storage rate and high-temperature $NO_x$ storage capacity in good balance. They have found as a result that a $NO_x$ storage material that surprisingly achieves high levels of $NO_x$ storage rate in low temperatures and $NO_x$ storage capacity in high temperatures can be provided by selecting a $NO_x$ storage material composed of $Mg_{1-y}Al_2O_{4-y}$ (wherein y is a number satisfying $0 \leq y \leq 0.2$) as a support and a barium compound and a noble metal loaded thereon, and further loading a specific metal oxide, such as $ZrO_2$, thereon.

The invention provides a $NO_x$ storage material comprising: $Mg_{1-y}Al_2O_{4-y}$, wherein y is a number satisfying $0 \leq y \leq 0.2$, a noble metal, an oxide of a metal other than the noble metal, and a barium compound, the noble metal, the oxide, and the barium compound being loaded on $Mg_{1-y}Al_2O_{4-y}$. The metal oxide comprises at least one metal oxide selected from zirconium oxide, praseodymium oxide, niobium oxide, and iron oxide.

The invention also provides an exhaust gas purification catalyst comprising the $NO_x$ storage material.

DESCRIPTION OF EMBODIMENTS

The invention will be described on the basis of its preferred embodiment. The $NO_x$ storage material of the invention comprises $Mg_{1-y}Al_2O_{4-y}$, wherein y is a number satisfying $0 \leq y \leq 0.2$, a noble metal, an oxide of a metal other than the noble metal, and a barium compound, the noble metal, the oxide, and the barium compound being loaded on $Mg_{1-y}Al_2O_{4-y}$. The metal oxide comprises at least one metal oxide selected from zirconium oxide, praseodymium oxide, niobium oxide, and iron oxide. The at least one metal oxide will hereinafter be also called a "specific metal oxide" or simply a "metal oxide".

The support of the $NO_x$ storage material of the invention on which a noble metal, a metal oxide, and a barium compound are loaded is not a weakly basic or acidic support but $Mg_{1-y}Al_2O_{4-y}$, where y is a number satisfying $0 \leq y \leq 0.2$ (this support will hereinafter be also called MAO). The $NO_x$ storage material of the invention achieves high $NO_x$ storage performance because of the use of MAO. A barium compound generally easily reacts with a support, and such a reaction reduces the specific surface area of the $NO_x$ storage material, thereby causing reduction in $NO_x$ storage performance. MAO, on the other hand, is less likely to react with a barium compound. Thus, loading a barium compound on MAO allows high-temperature $NO_x$ storage action of the barium compound to be maintained on a high level.

For MAO, y in the above formula is preferably equal to or smaller than 0.1 in view of $NO_x$ storage performance. MAO is more preferably spinel type $MgAl_2O_4$. MAO is prepared by, for example, co-precipitation using an aluminum material and a magnesium material.

With the view of improving both low-temperature $NO_x$ storage rate and high-temperature $NO_x$ storage capacity, the amount of MAO in the $NO_x$ storage material of the invention is preferably 50 to 93.9 mass %, more preferably 70 to 90 mass %. The amount of MAO may be obtained by, for example, determining by ICP-AES the amounts of Mg and Al in a $NO_x$ storage material sample solution prepared by, e.g., alkali fusion.

The $NO_x$ storage material of the embodiment may contain a support other than MAO for supporting a noble metal, a metal oxide, or a barium compound in addition to the MAO, noble metal, metal oxide, and barium compound. Examples of useful supports other than MAO include $Al_2O_3$, $TiO_2$, $SiO_2$, zeolite, MgO, $CeO_2$, $ZrO_2$, $CeO_2$—$ZrO_2$ double oxide.

As used herein, the expression "A loaded on B" does not mean that "A and B are in a merely mixed state" but that "particulate A is present on the surface of particulate B, the particulate B being much larger in size than the particulate A". The state of B having A loaded thereon can be confirmed by, for example, measuring the particle sizes, for example in SEM (scanning electron microscope) microscopy. The average particle size of A present on the surface of B is preferably 10% or less, more preferably 3% or less, even more preferably 1% or less, of that of B. The term "average particle size" as used herein refers to an average of the maximum Feret's diameters of at least 30 particles in SEM microscopy. The "maximum Feret's diameter" is defined as the furthest distance between any two points on the perimeter of a particle.

In the case where A on B is too small to be observed for size measurement by SEM, the presence of small particles of A loaded on the surface of B may be confirmed by (1) and (2):

(1) distribution of the element constituting A in an area where large particles of B are observed is confirmed by the use of an energy-dispersive or wavelength-dispersive X-ray analyzer (EDX or WDX) attached to SEM; and (2) the absence of a complex compound composed of the element constituting A and the element constituting B is confirmed in powder X-ray diffractometry.

In the case where a noble metal as A on B is too small to be observed for size measurement by SEM, the average particle size of the noble metal particles loaded on the support may be estimated by the method in which an adsorbate gas, such as CO, is adsorbed selectively on the surface of noble metal particles and analyzed to determine the ratio of the amount of exposed noble metal to the total amount of the loaded noble metal. This method is called "pulse chemisorption analysis" or "measurement of metal dispersion ratio".

The noble metal loaded on MAO in the $NO_x$ storage material of the embodiment is used to oxidize NO adsorbed onto the $NO_x$ storage material to $NO_2$. The noble metal is exemplified by a platinum group element, such as Pt, Rh, Pd, Ir, and Ru. In particular, Pt and Pd are preferred for their excellent oxidative activity. With a view to enhancing the oxidative activity of the $NO_x$ storage material thereby to increase the total $NO_x$ storage capacity of the $NO_x$ storage material, the amount of the noble metal loaded is preferably 0.1 mass % or more based on the total mass of the $NO_x$ storage material. With a view to reducing the amount of the noble metal to increase economy, the amount of the noble metal is preferably 10 mass % or less based on the total mass of the $NO_x$ storage material. From these considerations, the amount of the noble metal loaded is more preferably 0.2 to 8 mass %, even more preferably 0.5 to 5 mass %, based on the total mass of the $NO_x$ storage material. It is preferred that the noble metal be present in the form of metal atoms on MAO, but it may be present in the form of an oxide. The amount of the loaded noble metal may be obtained as the noble metal content in the $NO_x$ storage material. It is determined by, for example, ICP-AES on a $NO_x$ storage material sample solution prepared by, e.g., alkali fusion.

One of the characteristics of the invention lies in that the MAO support is loaded with both a specific metal oxide and a barium compound in addition to the noble metal. The metal oxide on the MAO support in the co-presence of the barium compound and the noble metal adsorbs $NO_x$, a product of oxidation by the noble metal, at a high rate and hands off the $NO_x$ to the barium compound efficiently, whereby the $NO_x$ storage rate by the barium compound increases. Simultaneously, an improving action on the thermal stability of the stored $NO_x$ is exhibited, bringing about an increase in high-temperature storage capacity. In other words, the effects of the invention are produced not by the mixed state of the specific metal oxide with MAO as in Example 5 of patent literature 1 but by the coexistence of, and proximity between, the barium compound and the specific metal oxide on the same support.

As will be understood by comparing Comparative Examples 2 and 3 with Examples hereinafter described, the low-temperature $NO_x$ storage rate rises when MAO is loaded with the specific metal oxide as well as the barium compound and the noble metal. As will also be seen from the comparison between Comparative Example 1 and each Example, the high-temperature $NO_x$ storage capacity increases extremely by the existence of the barium compound in addition to the metal oxide and the noble metal on MAO.

The specific metal oxide includes at least one metal oxide selected from zirconium oxide, praseodymium oxide, niobium oxide, and iron oxide. It is preferred for the specific metal oxide to include at least one of zirconium oxide, niobium oxide, and praseodymium oxide in terms of improvement on low-temperature $NO_x$ storage rate. Zirconium oxide is especially preferred in terms of further improvement on not only low-temperature $NO_x$ storage rate but high-temperature $NO_x$ storage capacity. It is preferred that zirconium oxide, praseodymium oxide, niobium oxide, and iron oxide be those represented by $ZrO_2$, $Pr_6O_{11}$, $Nb_2O_5$, and $Fe_2O_3$, respectively.

With a view to improving both low-temperature $NO_x$ storage rate and high-temperature $NO_x$ storage capacity, it is preferred for the metal oxide to be loaded in a specific amount. From this viewpoint, the amount of the metal oxide loaded is preferably 1 to 50 mass %, more preferably 3 to 30 mass %, even more preferably 5 to 20 mass %, still even more preferably 5 to 15 mass %, relative to the total mass of the $NO_x$ storage material. The above range of loading is particularly favorable when the metal oxide is zirconium oxide in the light of the improvement on the low-temperature storage rate and high-temperature storage capacity. The amount of the loaded metal oxide may be obtained as the metal oxide content in the $NO_x$ storage material. The content of the metal oxide can be obtained by, for example, determining by ICP-AES the amounts of Zr, Pr, Nb, and Fe in a $NO_x$ storage material sample solution prepared by, e.g., alkali fusion.

Examples of the barium compound include barium carbonate, barium aluminate, and barium zirconate, with barium carbonate being preferred in terms of improvement on low-temperature storage rate and high-temperature $NO_x$ storage capacity.

The amount of the barium compound loaded is preferably 5 mass % or more based on the total mass of the $NO_x$ storage material in terms of improvement in the total $NO_x$ storage capacity of the $NO_x$ storage material. In view of high-temperature storage performance, the amount is preferably 30 mass % or less relative to the total mass of the $NO_x$ storage material. From these viewpoints, the amount of the barium compound loaded is more preferably 6 to 25 mass %, even more preferably 8 to 20 mass %, relative to the total mass of the NO storage material. The amount of the loaded barium compound may be obtained as the barium compound content in the $NO_x$ storage material. The barium compound content can be obtained by, for example, determining by ICP-AES the amount of Ba in a $NO_x$ storage material sample solution prepared by, e.g., alkali fusion.

The $NO_x$ storage material of the embodiment is in the form of, e.g., powder, and the BET specific surface area thereof is preferably 10 to 200 $m^2/g$, more preferably 30 to 150 $m^2/g$, in terms of high $NO_x$ storage performance. The BET specific surface area can be determined by the method described in Examples given later.

The $NO_x$ storage material of the embodiment has each of the metal oxide, barium compound, and noble metal dispersed on the surface of the MAO support. The metal oxide, barium compound, and noble metal may be present at the same or different positions in the radial or height direction of the MAO support. When present at different positions, any one of the metal oxide, barium compound, and noble metal may be on the outermost side of the $NO_x$ storage material (the farthest from the support), and any other one of them may be on the support (closest to the center of the $NO_x$ storage material). For example, the barium compound may be located closer to the surface of the $NO_x$ storage material (farther from the support) than the metal oxide, and the noble metal may be located closer to the surface of the $NO_x$ storage material (farther from the support) than the barium compound. The positional relation of the metal oxide, barium compound, and noble metal in the direction of the height of the MAO support can be found out using an Scanning Electron Microscope (SEM) or Transmission Electron Microscope (TEM) equipped with an Energy Dispersive X-ray analyzer (EDX analyzer) or a Wavelength Dispersive X-ray analyzer (WDX analyzer).

The $NO_x$ storage material of the embodiment can be produced suitably by, for example, a method including the following steps.

Metal Oxide Loading Step:

An aqueous solution containing a water soluble salt of a specific metal and MAO powder are mixed, and the mixture is evaporated to dryness on an evaporator and fired to give powder of MAO loaded with the specific metal oxide M1 (M1/MAO).

Barium Compound Loading Step:

The M1/MAO is mixed with an aqueous solution containing a water soluble barium salt, and the mixture is evaporated to dryness on an evaporator and fired to give powder of MAO loaded with the specific metal oxide and the barium compound (M1/Ba/MAO).

Noble Metal Loading Step:

The M1/Ba/MAO is mixed with an aqueous solution containing a water soluble salt of a noble metal M2, and the mixture is evaporated to dryness and fired to yield powder of MAO loaded with the specific metal oxide, barium compound, and noble metal M2 (M2/M1/Ba/MAO).

The water soluble salt of the specific metal used in the metal oxide loading step is exemplified by a specific metal nitrate. The specific metal concentration of the aqueous solution of the water soluble specific metal salt is preferably 0.01 to 1 mol/L in terms of efficient loading of the metal oxide and $NO_x$ storage performance. The firing may be carried out in the atmosphere under conditions, for example at 500° to 800° C. for 1 to 10 hours.

The water soluble barium salt used in the barium compound loading step is exemplified by barium acetate and barium nitrate. The barium concentration of the water soluble barium salt aqueous solution is preferably 0.01 to 1 mol/L in terms of efficient loading of the barium compound and $NO_x$ storage performance. The firing may be carried out in the atmosphere under conditions, for example at 500° to 800° C. for 1 to 10 hours.

The water soluble noble metal salt used in the noble metal loading step is exemplified by a nitrate, an ammine complex salt, and a chloride. The noble metal concentration of the water soluble noble metal salt aqueous solution is preferably 0.001 to 0.1 mol/L in terms of efficient loading of the noble metal and $NO_x$ storage performance. The firing may be carried out in the atmosphere under conditions, for example at 450° to 700° C. for 1 to 10 hours.

The method for producing the $NO_x$ storage material of the invention is not limited to the above method. For instance, the metal oxide loading step may be preceded by the step of loading MAO with the barium compound, in which case the resulting Ba/MO is then loaded with the metal oxide and the noble metal. The metal oxide, barium compound, and noble metal may be loaded on MAO at the same time.

The $NO_x$ storage material of the invention may have any form, such as powder, paste, or granule. The $NO_x$ storage material of the embodiment is useful to make a catalyst for exhaust gas purification. For example, the $NO_x$ storage material of the embodiment may be used to form a catalyst active layer on a catalyst substrate to produce an exhaust gas purification catalyst. The catalyst substrate may be made, e.g., of ceramics or metallic materials. While the shape of the catalyst substrate is not particularly limited, the substrate usually has the form of a honeycomb, a plate, pellets, a DPF, a GPF, and so on. A honeycomb, DPF, or GPF is preferably used. These catalyst substrates may be made of ceramics, such as alumina ($Al_2O_3$), mullite ($3Al_2O_3\text{-}2SiO_2$), cordierite ($2MgO\text{-}2Al_2O_3\text{-}5SiO_2$), aluminum titanate ($Al_2TiO_5$), and silicon carbide (SiC); or metallic materials, such as stainless steel.

When the $NO_x$ storage material of the embodiment is used to form a catalyst layer on a catalyst substrate to provide an exhaust gas purification catalyst as described, another catalyst layer made of a hitherto known catalyst material may be provided on the layer of the $NO_x$ storage material of the embodiment. Conversely, a catalyst layer containing the $NO_x$ storage material of the embodiment may be formed on a catalyst layer of a known catalyst material formed on a substrate. Furthermore, a catalyst layer of a mixture containing the $NO_x$ storage material of the embodiment and a known catalyst material may be formed on a catalyst substrate.

The $NO_x$ storage material of the invention and the exhaust gas purification catalyst containing the same achieve higher $NO_x$ storage rates in low temperatures as compared with conventional $NO_x$ storage materials and also retain high levels of $NO_x$ storage capacity in high temperatures. Such a $NO_x$ storage material exhibits high $NO_x$ storage performance in a broad range of temperature, from engine start-up to high-temperature operation. Accordingly, the exhaust gas purification catalyst containing the $NO_x$ storage material of the invention is capable of efficiently converting harmful components such as $NO_x$ in fossil fuel-powered internal-combustion engines, such as lean-burn gasoline engines and diesel engines, and provides high exhaust gas purification performance.

EXAMPLES

The invention will now be illustrated in greater detail with reference to Examples, but it should be understood that the invention is not deemed to be limited thereto.

Example 1

(1) A zirconium oxynitrate ($ZrO(NO_3)_2 \cdot 2H_2O$) aqueous solution having a Zr concentration of 0.2 mol/L was prepared. $MgAl_2O_4$ powder was dispersed in the aqueous solution, and the dispersion was evaporated to dryness on a rotary evaporator. The resulting solid was fired in the atmosphere at 600° C. for 5 hours to give MAO powder loaded with zirconium oxide ($ZrO_2$) (hereinafter called Zr/MAO powder).

(2) The Zr/MAO powder was dispersed in a barium acetate ($Ba(CH_3COO)_2$) aqueous solution having a Ba concentration of 0.2 mol/L. The resulting dispersion was evaporated to dryness on a rotary evaporator, and the resulting solid was fired in the atmosphere at 600° C. for 5 hours to give MAO powder loaded with $ZrO_2$ and barium carbonate ($BaCO_3$) (hereinafter called Ba/Zr/MAO powder).

(3) The Ba/Zr/MAO powder was dispersed in distilled water. To the dispersion was added an aqueous solution of $Pt(NO_2)_2(NH_3)_2$ to prepare a dispersion having a Pt concentration of 0.01 mol/L. The resulting dispersion was evaporated to dryness on a rotary evaporator, and the resulting solid was fired in the atmosphere at 600° C. for 5 hours to provide a $NO_x$ storage material powder having $ZrO_2$, $BaCO_3$, and Pt loaded on the MAO powder (hereinafter called Pt/Ba/Zr/MAO powder).

The $NO_x$ storage material powder was found to contain 10 mass % of $ZrO_2$, 10 mass % of barium carbonate, and 1 mass % of platinum relative to the total mass of the $NO_x$ storage material powder.

Example 2

A $NO_x$ storage material powder having $Pr_6O_{11}$, $BaCO_3$, and Pt loaded on MAO powder (Pt/Ba/Pr/MAO) was obtained in the same manner as in Example 1, except for replacing the zirconium oxynitrate ($ZrO(NO_3)_2 \cdot 2H_2O$) with praseodymium nitrate ($Pr(NO_3)_3 \cdot 6H_2O$).

Example 3

A $NO_x$ storage material powder having $Fe_2O_3$, $BaCO_3$, and Pt loaded on MAO powder (Pt/Ba/Fe/MAO) was obtained in the same manner as in Example 1, except for replacing the zirconium oxynitrate ($ZrO(NO_3)_2 \cdot 2H_2O$) with iron nitrate ($Fe(NO_3)_3 \cdot 9H_2O$).

Example 4

A $NO_x$ storage material powder having $Nb_2O_5$, $BaCO_3$, and Pt loaded on MAO powder (Pt/Ba/Nb/MAO) was obtained in the same manner as in Example 1, except for replacing the zirconium oxynitrate ($ZrO(NO_3)_2 \cdot 2H_2O$) with niobic acid and a 0.01 mol/L aqueous solution of oxalic acid.

Examples 5 to 8

A $NO_x$ storage material powder having $ZrO_2$, $BaCO_3$, and Pt loaded on MAO powder was obtained in the same manner as in Example 1, except for changing the mixing ratio of the zirconium oxynitrate (ZrO(NO$_3$)$_2$.2H$_2$O) aqueous solution and MAO so that the content of ZrO$_2$ in the Pt/Ba/Zr/MAO might be as shown in Table 1 below. The resulting powders of Examples 5 to 8 are designated Pt/Ba/5Zr/MAO, Pt/Ba/15Zr/MAO, Pt/Ba/20Zr/MAO, and Pt/Ba/30Zr/MAO, respectively.

Comparative Example 1

A comparative NO$_x$ storage material powder having ZrO$_2$ and Pt loaded on MAO powder (Pt/Zr/MAO) was obtained in the same manner as in Example 1, except the following: the barium compound was not loaded on MAO and, in step (3), the Zr/MAO powder was dispersed in distilled water, followed by adding the Pt(NO$_2$)$_2$(NH$_3$)$_2$ aqueous solution to the dispersion.

Comparative Example 2

A comparative NO$_x$ storage material powder having BaCO$_3$ and Pt loaded on MAO powder (Pt/Ba/MAO) was obtained in the same manner as in Example 1, except the following: ZrO$_2$ was not loaded on MAO and, in step (2), the MAO powder was dispersed in the barium acetate (Ba(CH$_3$COO)$_2$) aqueous solution.

Comparative Example 3

A comparative NO$_x$ storage material powder having CeO$_2$, BaCO$_3$, and Pt loaded on MAO powder (Pt/Ba/Ce/MAO) was obtained in the same manner as in Example 1, except for replacing the zirconium oxynitrate (ZrO(NO$_3$)$_2$.2H$_2$O) with cerium nitrate (Ce(NO$_3$)$_3$.6H$_2$O).

TABLE 1

| | Support | Metal Oxide | Barium Compound | Nobel Metal | Metal Oxide/NO$_x$ Storage Material (mass %) |
|---|---|---|---|---|---|
| Example 1 | MAO | ZrO$_2$ | BaCO$_3$ | Pt | 10 |
| Example 2 | MAO | Pr$_6$O$_{11}$ | BaCO$_3$ | Pt | 10 |
| Example 3 | MAO | Fe$_2$O$_3$ | BaCO$_3$ | Pt | 10 |
| Example 4 | MAO | Nb$_2$O$_5$ | BaCO$_3$ | Pt | 10 |
| Example 5 | MAO | ZrO$_2$ | BaCO$_3$ | Pt | 5 |
| Example 6 | MAO | ZrO$_2$ | BaCO$_3$ | Pt | 15 |
| Example 7 | MAO | ZrO$_2$ | BaCO$_3$ | Pt | 20 |
| Example 8 | MAO | ZrO$_2$ | BaCO$_3$ | Pt | 30 |
| Comp. Example 1 | MAO | ZrO$_2$ | — | Pt | 10 |
| Comp. Example 2 | MAO | — | BaCO$_3$ | Pt | — |
| Comp. Example 3 | MAO | CeO$_2$ | BaCO$_3$ | Pt | 10 |

Evaluation

The BET specific surface area of the NO$_x$ storage material powders prepared in Examples 1 and 2 and Comparative Examples 2 and 3 was determined by the following method. As a result, the BET specific surface area of the NO$_x$ storage material powders of Examples 1 and 2 and Comparative Examples 2 and 3 was found to be 75.6 m$^2$/g, 49 m$^2$/g, 81.9 m$^2$/g, and 68.2 m$^2$/g, respectively.

Method for Measurement of BET Specific Surface Area:

The specific surface area was measured by the BET three-point method using a surface area analyzer QUA-DRASORB SI from Quantachrome Corp. As an adsorbate gas for the measurement, nitrogen gas was used.

The NO$_x$ storage material powders prepared in Examples 1 to 8 and Comparative Examples 1 to 3 were evaluated for NO$_x$ storage rate and storage capacity in accordance with the following methods. The results obtained are shown Table 2.

Method of Evaluation of NO$_x$ Storage Rate and Storage Capacity:

A fixed-bed flow reactor was used for the evaluation. The NO$_x$ storage material powder weighing 100 mg was heated to 700° C. and kept at that temperature for 30 minutes in a helium stream (pre-treatment). The sample powder was allowed to cool to 200° C. The powder at 200° C. after the pre-treatment was contacted with a 100 ml/min of NO$_x$ gas (composition: 0.1 vol % of NO, 10 vol % of O$_2$, and the balance of He) for 30 minutes. The storage capacity, i.e., the amount of NO$_x$ stored (mol/g) at 200° C. in 200 seconds from the start of the contact with the NO$_x$ gas was calculated as an NO$_x$ storage rate from the NO$_x$ concentration in the flowing gas. The rate of NO$_x$ storage per second (mol/(g·sec)) is obtained by dividing the calculated storage capacity by the gas contact time (200 seconds).

The NO$_x$ storage material powder was then maintained at 200° C. for 40 minutes and heated up to 700° C. at a rate of 10° C./min in a helium (100 vol %) stream. The amount of NO$_x$ released during the temperature elevation from 450° to 700° C. was calculated from the NO$_x$ concentration in the flowing gas. The NO$_x$ storage material desorbs the stored NO$_x$ with increase in temperature in a helium atmosphere. The amount of NO$_x$ released in a specific temperature range indicates the NO$_x$ storage capacity, i.e., the amount of NO$_x$ stored, in that temperature range.

The NO$_x$ concentrations were measured using a chemoluminescence NO$_x$ meter NOA-7000 from Shimadzu Corp.

TABLE 2

| | NO$_x$ Storage Material | NO$_x$ Storage Rate (initial 0 to 200 secs) (mol/g) | High-temp. (450°-700° C.) NO$_x$ Storage Capacity (mol/g) |
|---|---|---|---|
| Example 1 | Pt/Ba/Zr/MAO | 9.58 × 10$^{-5}$ | 2.61 × 10$^{-4}$ |
| Example 2 | Pt/Ba/Pr/MAO | 9.10 × 10$^{-5}$ | 1.38 × 10$^{-4}$ |
| Example 3 | Pt/Ba/Fe/MAO | 8.21 × 10$^{-5}$ | 1.98 × 10$^{-4}$ |
| Example 4 | Pt/Ba/Nb/MAO | 9.24 × 10$^{-5}$ | 1.51 × 10$^{-4}$ |
| Example 5 | Pt/Ba/5Zr/MAO | 8.51 × 10$^{-5}$ | 2.70 × 10$^{-4}$ |
| Example 6 | Pt/Ba/15Zr/MAO | 9.23 × 10$^{-5}$ | 2.35 × 10$^{-4}$ |
| Example 7 | Pt/Ba/20Zr/MAO | 8.65 × 10$^{-5}$ | 2.20 × 10$^{-4}$ |
| Example 8 | Pt/Ba/30Zr/MAO | 8.37 × 10$^{-5}$ | 1.68 × 10$^{-4}$ |
| Compara. Example 1 | Pt/Zr/MAO | 1.05 × 10$^{-4}$ | 0.37 × 10$^{-4}$ |
| Compara. Example 2 | Pt/Ba/MAO | 8.01 × 10$^{-5}$ | 1.38 × 10$^{-4}$ |
| Compara. Example 3 | Pt/Ba/Ce/MAO | 7.54 × 10$^{-5}$ | 1.86 × 10$^{-4}$ |

As shown in Table 2, the NO$_x$ storage materials of Examples 1 to 8, which are MAO having a specific metal oxide and a barium compound as well as a noble metal loaded thereon, achieve low-temperature (200° C.) NO$_x$ storage rates of 8.21×10$^{-5}$ mol/g or higher and high-temperature (450° to 700° C.) NO$_x$ storage capacity of 1.38×10$^4$ mol/g or higher, proving capable of accomplishing high levels of both of low-temperature NO$_x$ storage rate and high-temperature NO$_x$ storage capacity.

In contrast, the NO$_x$ storage material of Comparative Example 1, which does not have a barium compound loaded, is equivalent in low-temperature NO$_x$ storage rate performance to those of Examples but greatly inferior in high-temperature $NO_x$ storage capacity. The $NO_x$ storage material of Comparative Example 2, which has no specific metal oxide loaded, and that of Comparative Example 3, which uses ceria in place of the specific metal oxide, are equivalent to those of Examples in high-temperature $NO_x$ storage capacity but inferior in low-temperature $NO_x$ storage rate.

INDUSTRIAL APPLICABILITY

The invention provides a $NO_x$ storage material exhibiting high $NO_x$ storage rate in low temperatures and high $NO_x$ storage capacity in high temperatures. The invention also provides an exhaust gas purification catalyst having the $NO_x$ storage material and exhibiting excellent $NO_x$ conversion performance.

The invention claimed is:

1. A nitrogen oxide storage material comprising:
$Mg_{1-y}Al_2O_{4-y}$, wherein y is a number satisfying $0 \leq y \leq 0.2$,
a noble metal,
a zirconium oxide, and
a barium compound,
the noble metal, the zirconium oxide, and the barium compound being loaded on $Mg_{1-y}Al_2O_{4-y}$.

2. The nitrogen oxide storage material according to claim 1, wherein the zirconium oxide is present in an amount of 1 to 50 mass % based on the nitrogen oxide storage material.

3. The nitrogen oxide storage material according to claim 2, wherein the zirconium oxide is present in an amount of 5 to 20 mass % based on the nitrogen oxide storage material.

4. The nitrogen oxide storage material according to claim 1, wherein the barium compound is barium carbonate.

5. The nitrogen oxide storage material according to claim 1, wherein the noble metal is platinum.

6. The nitrogen oxide storage material according to claim 1, wherein the $Mg_{1-y}Al_2O_{4-y}$ is $MgAl_2O_4$.

7. The nitrogen oxide storage material according to claim 1, wherein the nitrogen oxide storage material is in a powder form and has a BET specific surface area of 10 to 200 $m^2/g$.

8. An exhaust gas purification catalyst comprising the nitrogen storage material according to claim 1.

9. A method for producing the nitrogen oxide storage material according to claim 1, the method comprising the following steps (1), (2), and (3) in this order:
(1) mixing a solution containing a soluble salt of zirconium and a $Mg_{1-y}Al_2O_{4-y}$ powder, evaporating the mixture to dryness, and then obtaining a M1/MAO which is a powder of $Mg_{1-y}Al_2O_{4-y}$ on which the zirconium oxide M1 is loaded;
(2) mixing the M1/MAO with a solution containing a soluble barium salt, evaporating the mixture to dryness, and then obtaining a M1/Ba/MAO which is a powder of $Mg_{1-y}Al_2O_{4-y}$ on which the zirconium oxide and a barium compound are loaded; and
(3) mixing the M1/Ba/MAO with a solution containing a soluble salt of the noble metal M2, evaporating the mixture to dryness, and then obtaining a M2/M1/Ba/MAO which is a powder of $Mg_{1-y}Al_2O_{4-y}$ on which the zirconium oxide, the barium compound, and the noble metal M2 are loaded.

10. A method for producing the nitrogen oxide storage material according to claim 1, the method comprising the following steps (1), (2), and (3) in this order:
(1) mixing an aqueous solution containing a water soluble salt of zirconium and a $Mg_{1-y}Al_2O_{4-y}$ powder, evaporating the mixture to dryness, and firing the resulting mixture to give a M1/MAO which is a powder of $Mg_{1-y}Al_2O_{4-y}$ on which the zirconium oxide M1 is loaded;
(2) mixing the M1/MAO with an aqueous solution containing a water soluble barium salt, evaporating the mixture to dryness, and firing the resulting mixture to give a M1/Ba/MAO which is a powder of $Mg_{1-y}Al_2O_{4-y}$ on which the zirconium oxide and a barium compound are loaded; and
(3) mixing the M1/Ba/MAO with an aqueous solution containing a water soluble salt of the noble metal M2, evaporating the mixture to dryness, and firing the resulting mixture to yield a M2/M1/Ba/MAO which is a powder of $Mg_{1-y}Al_2O_{4-y}$ on which the zirconium oxide, the barium compound, and the noble metal M2 are loaded.

* * * * *